United States Patent [19]

Caffey

[11] 4,087,063
[45] May 2, 1978

[54] PARACHUTE SUSPENSION LINE STOWAGE DEVICE

[75] Inventor: Larry G. Caffey, Holtville, Calif.

[73] Assignee: The United States of America as represented by the Secretary of the Navy, Washington, D.C.

[21] Appl. No.: 804,032

[22] Filed: Jun. 6, 1977

[51] Int. Cl.² ............................................. B64D 17/40
[52] U.S. Cl. ..................................... 244/148; 244/147
[58] Field of Search ................................. 244/147, 148

[56] References Cited

U.S. PATENT DOCUMENTS 2,366,764  1/1945  Wilson .................................. 244/148
3,087,694  4/1963  Sepp .................................. 244/148 X

FOREIGN PATENT DOCUMENTS 571,267  8/1945  United Kingdom ................. 244/148

Primary Examiner—Barry L. Kelmachter
Attorney, Agent, or Firm—R. S. Sciascia; G. J. Rubens

[57] ABSTRACT

A parachute suspension line stowage assembly kit is provided for a parachute pack container that is more compact making more space available in the pack for housing other components of the parachute system and enabling a smaller size container. The assembly is fabricated basically of fabric material mounted on a rigid support plate for forming pockets for a plurality of looped parachute suspension lines. The novel stowage device is capable of withstanding higher shock loads; and is adaptable to different size parachute containers.

7 Claims, 4 Drawing Figures

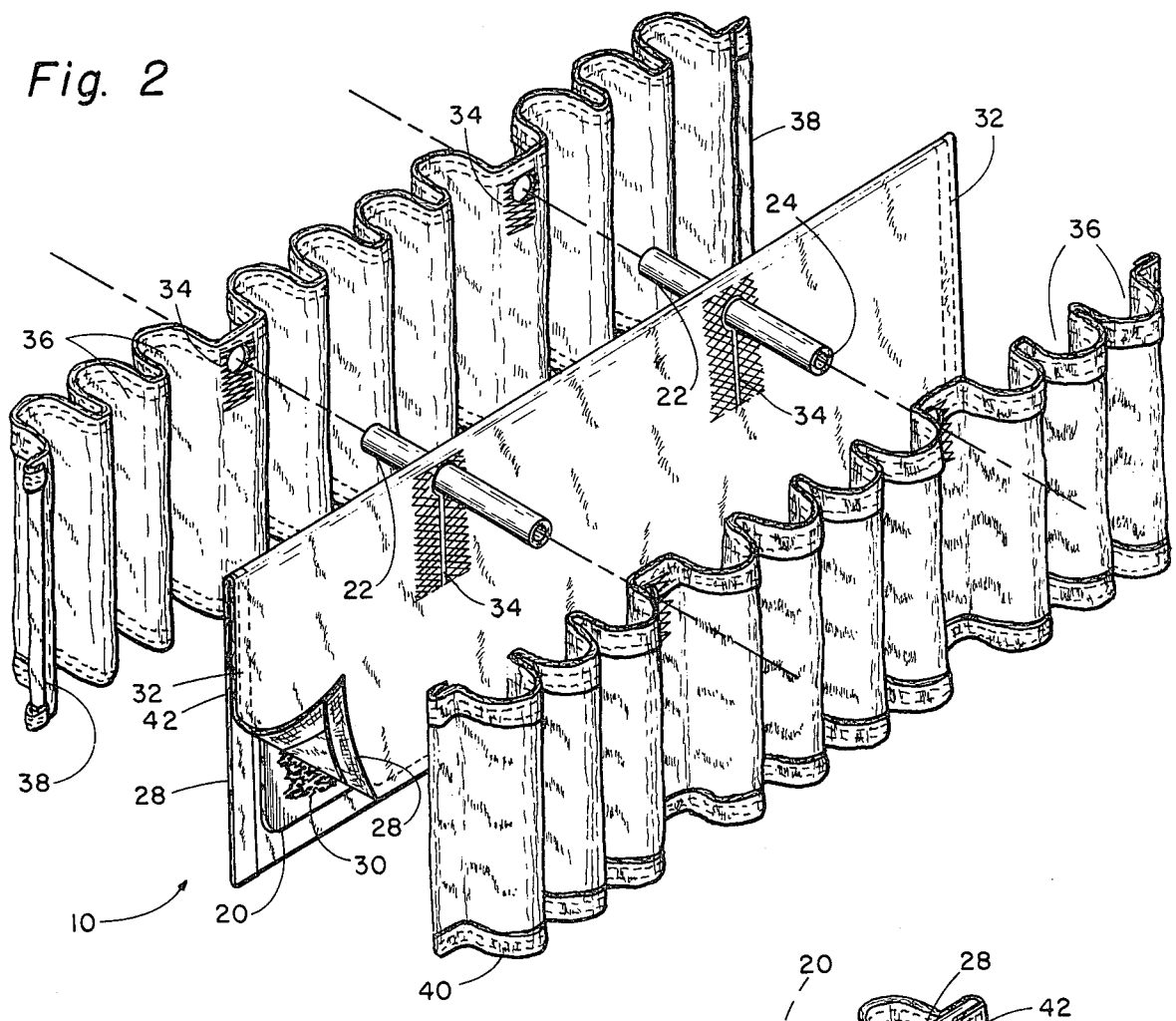
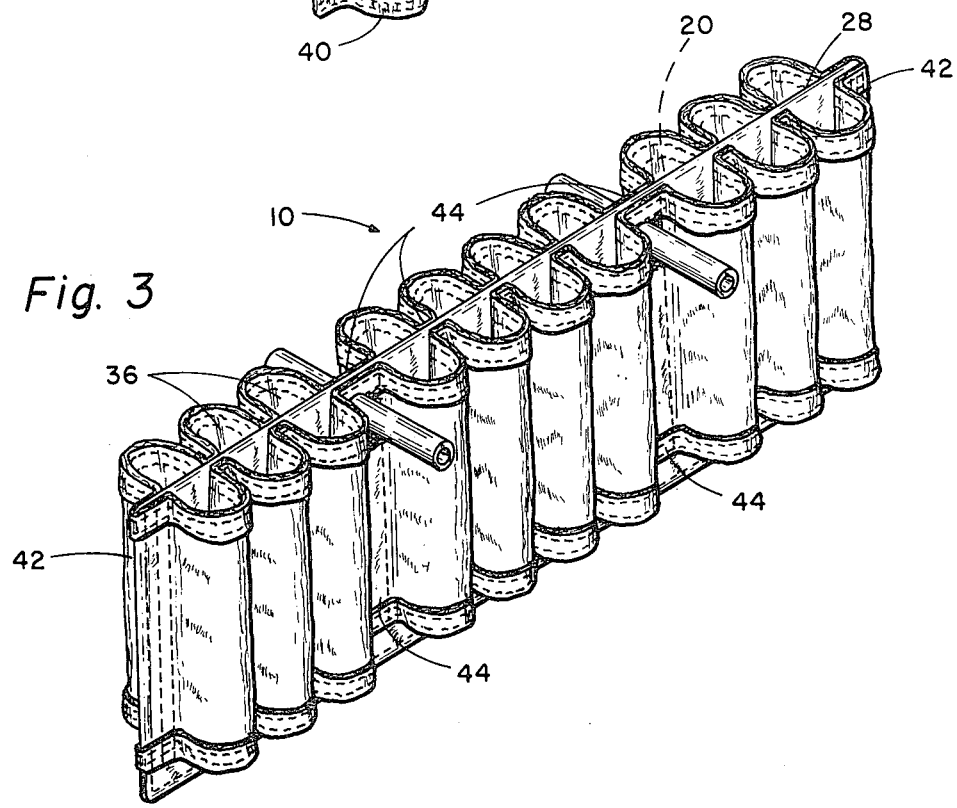

4,087,063

PARACHUTE SUSPENSION LINE STOWAGE DEVICE

BACKGROUND OF THE INVENTION

This invention relates to parachute pack-type containers and more particularly to a device for compactly stowing the suspension lines within the container for orderly deployment.

The storage device currently employed in Navy parachute containers consists of a hard, integrally molded plastic tray having a plurality of depending test-tube like plastic compartments to receive the folded suspension lines. For typical personnel-type parachutes some twenty compartments are provided to accommodate successive portions of the folded bundle of suspension lines.

It has been found under certain conditions of use and handling, the plastic tray will crack exposing the suspension lines to sharp cutting edges. In addition, the broken tray can cause some of the suspension lines to hang-up during the withdrawal, reducing parachute deployment reliability.

The prior art plastic tray required a protective reinforcing rim when inserted into the container which made the tray suitable for only the particular parachute container for which it was designed.

SUMMARY OF THE INVENTION

A flexible parachute suspension line stowage device is provided for parachute pack containers that greatly increases the reliability of parachute deployment. The device comprises a stiffener support plate having a fabric cover adhesively secured thereto, the plate forming the backbone of the device. A wide fabric strap is intermittently sewn to each front and rear side of the fabric cover in a manner to provide a plurality of laterally disposed pockets, each pocket adapted to receive a successive folded portion of the bundled suspension lines. A pair of spaced rods are mounted perpendicularly to the plate extending from front and rear sides, and by means of screws threaded in the free ends of the rods secure the device within the parachute container. The fabric cover and straps have openings for the passage of the fastening rods.

BRIEF DESCRIPTION OF THE DRAWINGS

FIG. 2 is an exploded view of the components of the parachute suspension line stowage device.

FIG. 3 is an assembled view of the device in FIG. 2, showing the details of construction.

DESCRIPTION OF THE PREFERRED EMBODIMENTS

Figure 1:
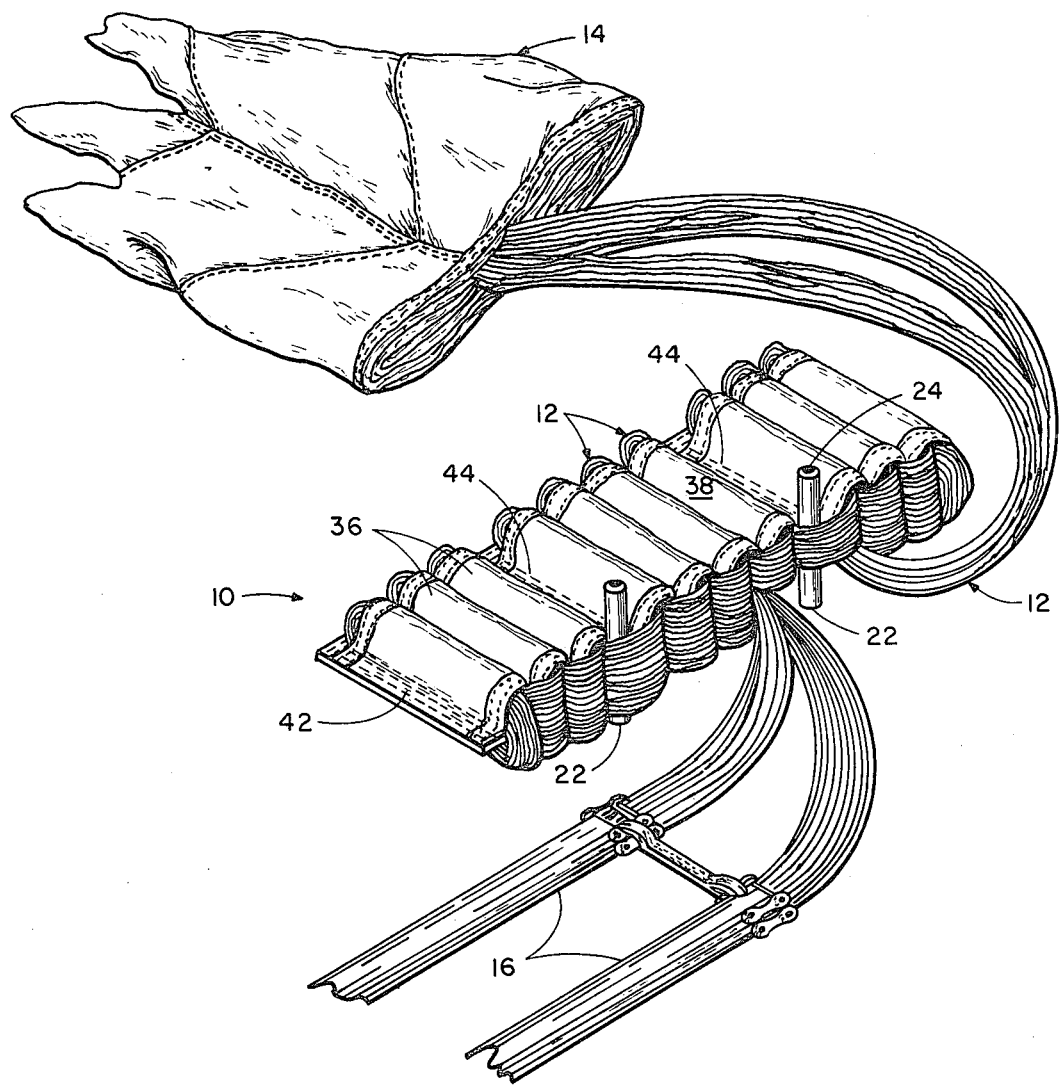
FIG. 1 is a perspective view of the stowage device accommodating the bundled parachute suspension lines, the parachute container being omitted, and showing its relationship with the parachute canopy and the riser straps from the harness.
Figure 4:
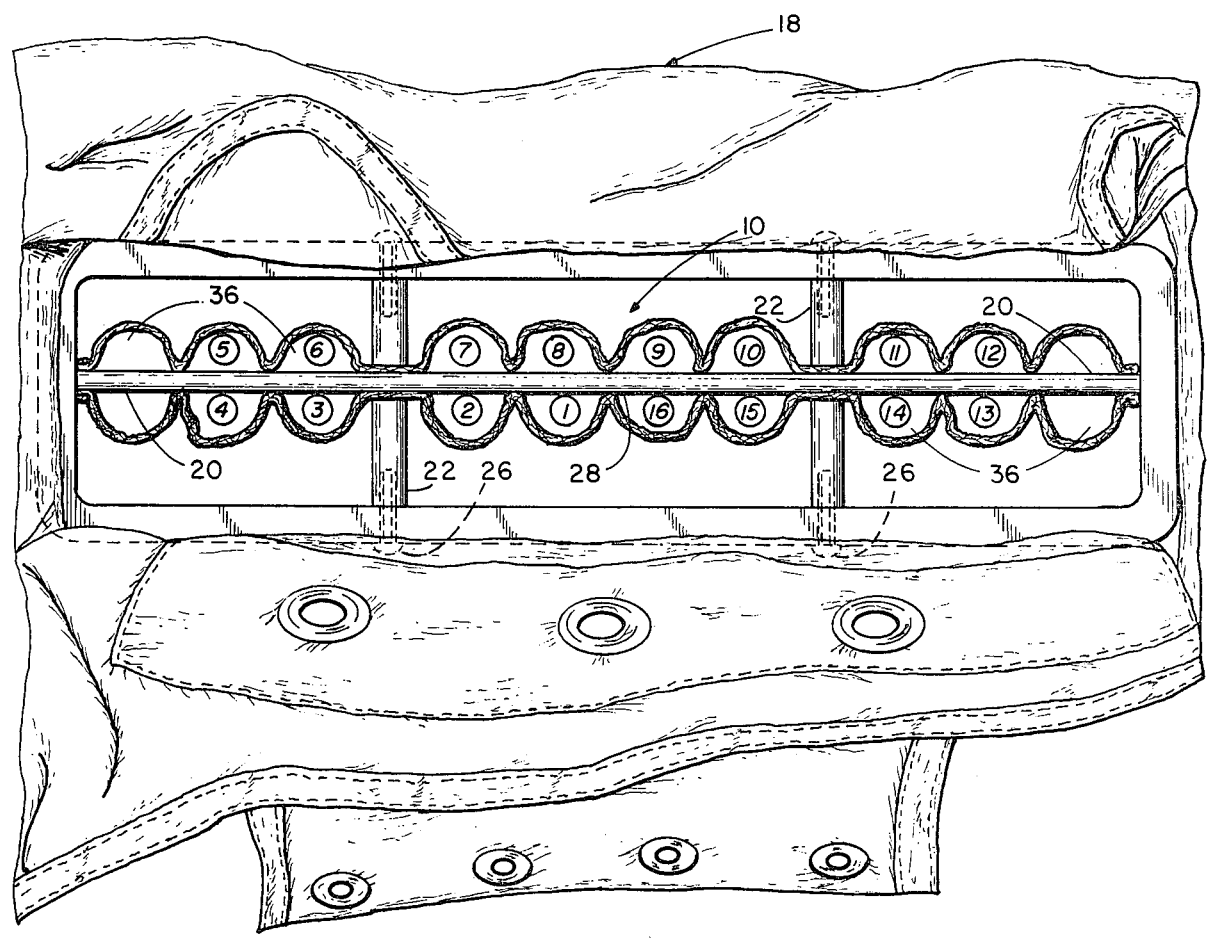
FIG. 4 is a top view of the stowage device nested in a parachute container, the suspension lines being omitted.

Referring to the drawings where like reference numerals refer to similar parts throughout the drawings, there is shown in FIG. 1 a novel stowage device 10 for individually stowing a portion of a bundle of suspension lines 12 extending between a parachute canopy 14 and a pair of riser straps 16 attached to a parachute harness, not shown. The term suspension lines is intended to include the anti-squid lines or pull-down-vent lines that also may be used in the parachute. As shown in FIG. 4, the stowage device 10 functions to store the suspension lines in a parachute pack container 18 for an orderly successive withdrawal during parachute deployment.

The details of novel suspension line stowage device 10 is best shown in FIGS. 2–4, and comprises a central stiffener plate 20, preferably constructed of metal so as to be nonfrangible. Welded or otherwise secured at the upper end, and extending perpendicularly to the front and rear sides of plate 20, are two pairs of fastener rods 22 having threaded holes 24 at their free ends thereof for receiving screws 26 for attachment to the parachute container 18, (FIG. 4). Accordingly, the total length of each pair of longitudinally aligned rods is substantially the width of parachute container 18 to fit snugly therein.

A nylon fabric U-shaped cover 28 is fitted over stiffener plate 20. Slotted cutout portions 34 are provided in the front and rear flaps of cover 28 for passage of the ends of rods 22, the slots thereafter being sewn together to form a snug fitting cover. Cover 28 is then secured by adhesive 30 throughout to plate 20, and the overlapping ends at their sides and bottom are sewn together at 32. A pair of wide front and rear nylon straps 38 and 40, respectively, are attached to both sides of cover 28 to form a pair of front and rear row of pockets 36. Both strap ends are sewn at 42 (FIG. 3) to the overlapping sides of cover 28, and the straps are also sewn at spaced vertical intermediate positions at 44 in a serpentine manner to form the series of the adjacent pockets 36. As a practical matter, straps 38 and 40 should be sewn to cover 28 before it is adhesively attached to stiffener plate 20. Each pocket 36 is adapted to receive a successive folded portion of the bundled suspension lines, and the looped ends of the bundle may protrude beyond the top and bottom edges of the straps. By providing the stowage device with 20 pockets, it will accommodate all of the personnel-type parachutes currently used by the U.S. Navy. For example, in the standard Navy 28 foot personnel-type parachute only 16 of the pockets are actively utilized, the remaining four pockets being spare unused pockets.

The suspension lines are stowed in stowage device 10 with the aid of a conventional tool (not shown) before the latter is inserted and secured in place in container 18 by rods 22 and screws 26. The numerical sequence of pockets 36 stowage device for the packing operation is as marked in FIG. 4, starting with pocket number 1 and moving clockwise from front to back and return. From 10 to 12 inches is allowed to remain between the top of stowage device 10 and the skirt of canopy 14.

After the suspension lines are stowed in device 10, the assembly is inserted into parachute container 18 and secured therein by tightening screws 26 into the free ends of fastener rods 22. As device 10 is compressible, the voids between the packed stowage device and a stock container 18 can be utilized for packing other components of the parachute system without compromising the orderly deployment of the suspension lines. In new construction a smaller parachute container can be utilized.

Accordingly, the novel stowage device provided by this invention enables a smaller parachute container to be utilized, or more available stowage space in existing container configurations. Breakage factor of the stowage device is eliminated, as is faulty parachute deployment due to hang-ups or cut suspension lines.

Obviously many modifications and variations of the present invention are possible in the light of the above teachings. It is therefore to be understood that within the scope of the appended claims the invention may be practiced otherwise than as specifically described.

What is claimed is:

1. A parachute suspension line stowage device for a parachute pack container comprising:

a rigid supporting plate having a first surface and a second surface;

flexible fabric material intermittently secured to each of said surfaces of said rigid plate to form a plurality of laterally arranged open-ended individual pockets, each pocket capable of releasably supporting a different portion of a plurality of looped suspension lines;

means on said supporting plate for securing said device in spaced relation within said container with the longitudinal centerlines of the pockets extending in the same direction as the parachute withdrawal force on the suspension lines;

whereby said suspension lines can be releasably supported within the parachute pack more compactly and without danger of being cut as they are withdrawn during deployment.

2. The stowage device of claim 1 wherein said flexible fabric material comprises a single integral fabric strap attached to each surface of said plate, each said strap being of a width to support a central portion of the looped suspension lines and extending for a major portion of the length of said looped suspension lines.

3. The stowage device of claim 1 wherein said securing means comprises a plurality of spaced fastener rods mounted to said plate to extend out perpendicularly on both sides thereof.

4. The stowage device of claim 2 wherein said plate is flat and rectangular in shape and is provided with a fabric cover adhesively attached thereto, and each said fabric strap being intermittently sewn to said cover prior to the attachment of the cover to the plate to form said pockets individually.

5. The stowage device of claim 2 wherein said pockets extend transversely the length of said supporting plate and for substantially the same width thereof.

6. The stowage device of claim 4 wherein said fabric cover is adhesively secured to said plate.

7. A suspension line stowage device insert for a parachute container comprising:

a rigid, flat rectangular stiffener plate having front and back faces;

a plurality of spaced fastener rods extending perpendicularly from and secured to said faces;

a fabric cover adhesively secured to the front and back faces of said stiffener plate;

a fabric strap sewn at spaced locations to said fabric cover on each front and rear portion of the cover to provide a plurality of laterally spaced, individual pockets on both faces of said stiffener plate for releasably supporting a central portion of a plurality of looped suspension lines;

means for securing the fastener rods within the parachute container for spacing said stowage device therein with the longitudinal centerlines of the pockets oriented in the same direction as the parachute withdrawal force on the suspension lines.

* * * * *